Dec. 7, 1965  L. L. LOCKSHIN  3,221,970
FLUX DISC
Filed March 21, 1962  2 Sheets-Sheet 1
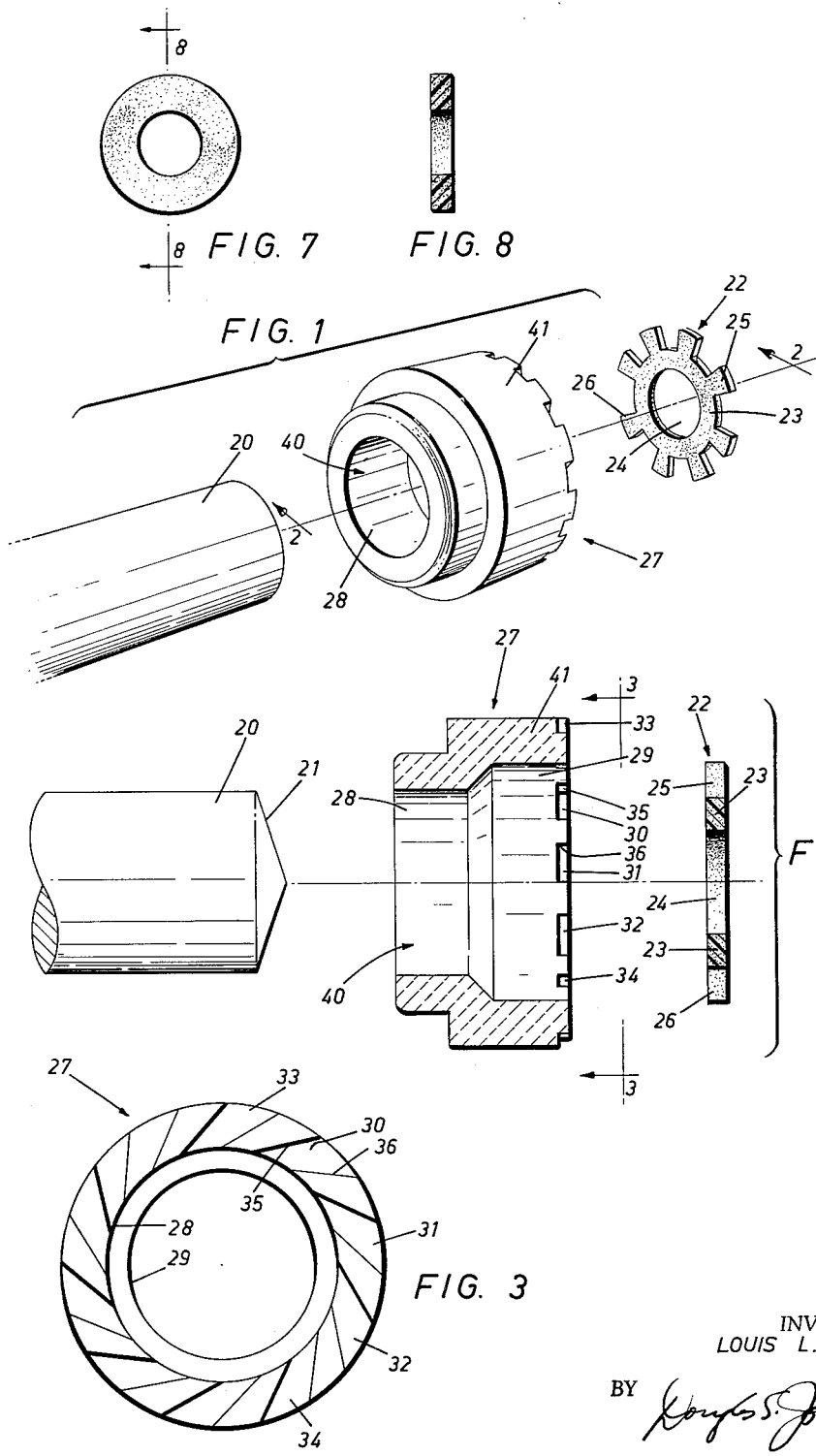
INVENTOR.
LOUIS L. LOCKSHIN
BY 
Attorney Dec. 7, 1965  L. L. LOCKSHIN  3,221,970
FLUX DISC
Filed March 21, 1962  2 Sheets-Sheet 2
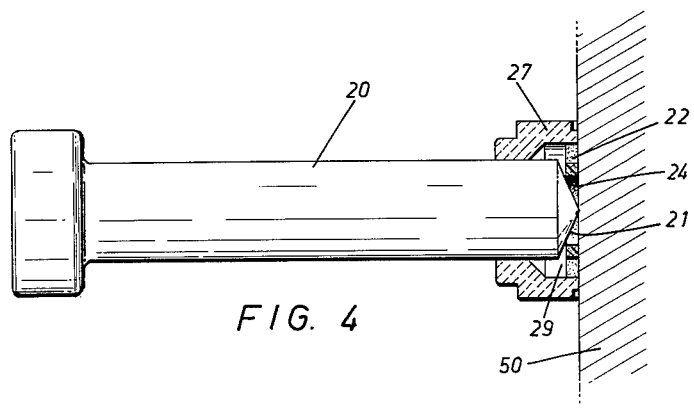
FIG. 4
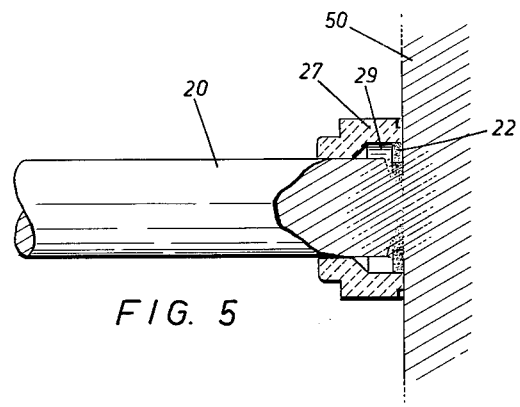
FIG. 5
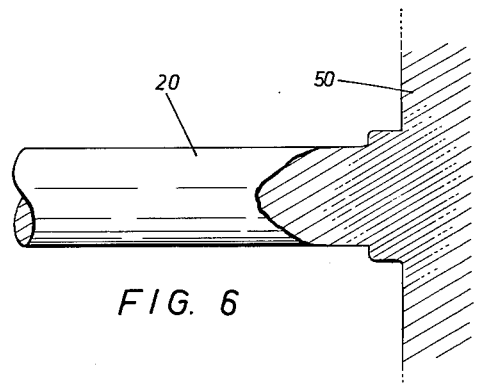
FIG. 6
INVENTOR.
LOUIS L. LOCKSHIN
BY 
Attorney United States Patent Office 3,221,970
Patented Dec. 7, 1965

3,221,970
FLUX DISC
Louis Leon Lockshin, 329 Richview Ave.,
Toronto, Ontario, Canada
Filed Mar. 21, 1962, Ser. No. 181,370
4 Claims. (Cl. 228—56)

This invention relates to the end-welding of stud members to surfaces of metallic objects and more particularly, to the provision of fluxing means for effecting such welds.

It is possible to provide a stud of such a composition that it will form satisfactory welds without the use of a fluxing material. However, for certain applications, such studs have never been a practical commercial possibility and development has been directed to a low-cost, easily manufactured stud in which the flux material is included in the welding end of a stud of conventional composition.

While these last-mentioned types of stud have taken various forms and many means have been resorted to to secure the fluxing material with varying degrees of commercial success, they have, almost invariably, required machining or working of the welding end to provide a chamber or chambers adapted to accommodate the fluxing material.

The fluxing material is generally a powder or granulated particles and it is extremely difficult to insert and maintain in position while a plate is secured thereover.

It is, therefore, an object of this invention to provide a fluxing material which avoids the main objections inherent in the use of a fluxing powder.

It is another object of this invention to provide an improved fluxing material which may be used with conventional welding studs.

It is another object of this invention to provide an improved fluxing means which avoids the main objections inherent in the use of a fluxing powder and in such a form that a welding stud may be easily oriented with respect to a surface to which it is to be welded and the flux will be substantially evenly distributed over the weld area.

In accordance with the present invention, the inventor provides an improved flux disc which has a hole therethrough through which the adjacent end of the stud may project to provide the initial contact with the surface or plate to which the stud is to be welded. The flux disc may be spaced apart a short distance from the stud so that the flux will not be dissipated too quickly on effecting the arc. The flux disc may be supported in this spaced apart relationship by a ferrule and in the preferred embodiment has a configuration which provides for more even distribution of the molten metal.

Novel compositions for a solid flux disc are also set forth in this present specification which employ intimately mixed predetermined proportions of finely divided metals and a combustible carrier.

Also in accordance with this present invention, the ferrule is provided with channels or flutes on the plate abutting surface which extend inclinedly through the peripheral wall to permit the escape of the gaseous products of the reaction while substantially confining the molten metal.

The nature and objects of the present invention will be more fully understood from the following description taken in conjunction with the accompanying drawings in which:

FIGURE 1 is an exploded view of the several components prior to effecting a weld in accordance with the present invention;

FIGURE 2 is a view taken along line 2—2 of FIGURE 1;

FIGURE 3 is a view taken along line 3—3 of FIGURE 2;

FIGURES 4, 5 and 6 are partial sectional views illustrating the relationship of the various components through the several steps of a welding process in accordance with the invention;

FIGURE 7 is a plan view of an alternative embodiment of a fluxing means in accordance with the present invention; and FIGURE 8 is a section taken along line 8—8 of FIGURE 7.

The stud 20 employed in this present invention is of cylindrical shape with a conical terminal portion 21 shown in FIGURES 2 and 4. This conical terminal portion aids in correctly locating the stud with respect to the weld area thus reducing the probability of misfires. It also aids in the location of a flux disc such as 22 so that the fluxing material will be relatively uniformly distributed over the entire weld area during the creation of the arc.

The flux disc 22 may be fabricated from any suitable fluxing material such as aluminum or iron, or it may be of a composition which will be described later in this specification. As shown in FIGURES 1 and 2, and FIGURE 4, one embodiment of a flux disc 22 comprises an annular ring portion 23 defining a central hole 24, and from the outer periphery of ring portion 23 a plurality of regularly disposed radial arms such as 25 and 26 extend outwardly.

A non-metallic ferrule 27 is also provided to substantially limit the spattering of the molten metal produced while permitting the gaseous products of the reaction to escape. Ferrule 27 is generally cylindrical in form, having a chamber 40 extending longitudinally therethrough. Chamber 40 in turn, comprises a first chamber 28 radially dimensioned to slidably fit over the body of stud 20, and a second chamber 29 having an increased internal radius substantially equal to the greatest radius of flux disc 22. It will be understood that the internal radius is so dimensioned that flux disc 22 may slidably fit thereon so that the flux disc may be accurately located. Similarly, if the form of the flux disc is other than annular, the internal dimensions of chamber 29 will substantially correspond. The wall of chamber 29 is indicated at 41 and through this wall a series of regularly spaced channels such as 30, 31, 32, 33, 34 and 35 extend.

Each of these channels or flutes is defined by diverging walls inclined to the radii of wall 41. This structure is exemplified by walls 35 and 36 of channel 34. The diverging inclined attitude of these walls is such that there is no direct radial path from chamber 29 to the exterior. The molten metal will accordingly be substantially confined and the spatter will impinge upon the opposedly facing wall and also be confined. However, the gaseous products will be permitted to escape.

Ferrule 27 may be formed from a refractory ceramic material or any suitable material which is heat-resistant and easily fractured either before or after subjection to heat. Ferrules of phenolic resin have been used successfully and they have had the advantage of imperceptible shrinkage on heating. The characteristics of phenolic resins are also more consistent and consequently, production is simplified.

In FIGURES 4, 5 and 6, 50 is a metal plate to which stud 20 is to be end welded. To effect the weld, a flux disc 22 is placed within chamber 29 of ferrule 27 and placed over the weld area. Stud 20 is then passed through the ferrule 27 and the central hole 24 of flux disc 22 until the conically tapered portion 21 thereof touches the metal plate 50. As will be seen from FIGURE 4, the conical portion 21 of stud 20 will effect the initial contact with plate 50. The inner periphery of flux disc 22 is spaced apart from the adjacent surface of conical portion 21 so that the fusion of flux disc 22 and conical portion 21 are not completely simultaneous. When simultaneous, the molten metal from the flux disc may often be dissipated prior to providing any effective value to the process. It will also be noticed that the external radius or dimension of flux disc 22 is substantially equal to the internal diameter of the chamber 29 so that it may be securely fitted therein.

Upon forming an arc between stud 20 and plate 50, the terminal part of portion 21 will melt. Ring portion 23 of flux disc 22 will then melt fusing with the metal of the plate and stud. Momentarily, the radial arms such as 25 and 26 will remain solid then they too will fuse so that on solidifying, the weld will have the form illustrated in FIGURE 6. However, for the very short period of the cycle during which they are solid, the radial arms will provide temporary channels—guiding the flow of the molten metmetal and evenly distributing it over the weld area. It will be seen that this structure will permit substantially even distribution of the flux over the weld area even when the stud is misaligned or inclined to the plate. On cooling, the ferrule 27 is removed by smashing it with any suitable means.

In FIGURES 7 and 8 an annular flux disc 22' is illustrated and it will be noticed from the hatching of FIGURE 8 that it is of novel composition.

For the purposes of this specification, a fluxing material shall include silver, brass, copper, aluminum, aluminum oxide, iron, iron oxide, or any suitable equivalent or combination of two or more of such elements or their compounds.

Essentially, the composition of the flux 22' of FIGURE 8 comprises a fluxing material in a finely divided form intimately mixed with a combustible carrier so that when subjected to heat, the flux material becomes molten and gaseous products such as steam, carbon monoxide and/or carbon dioxide produced by the combustion of the carrier will be given off to leave a minimal carbon residue in the weld. Suitable carriers may be provided by any of the individual mixtures indicated through 1 to 10 of Table A below.

*Table A*

1. Ethyl cellulose, acetone, dibutyl phthalate.
2. Chlorinated rubber, glyceryl esters, chlorinated naphthalene.
3. Polystyrene, methylene chloride, xylol, diocytyl phthalate.
4. Polyvinyl acetate, ethyl dichloride alcohol, tricresyl phosphate.
5. Cellulose acetate, methylene chloride, ethylene glycol, methyl alcohol, monomethyl ethers, triphenol phosphate.
6. Cellulose acetate butyrate, acetone, methylene chloride, dimethyl phosphate, p. toluene sulfonic.
7. Polyvinyl butyrate, tricresyl phosphate.
8. Polyvinyl formal, alcohol, benzene, acetone.
9. Vinyl chloride, cyclohexanone, tricresyl phosphate.
10. Polymethyl methacrylate, butyl acetate, toluene, isobutyl phthalate, methyl alcohol.

As will be observed, these mixtures generally comprise an ester or mixed ester of cellulose, or a vinyl resin, a suitable plasticizer, and, if needed, a volatile organic solvent.

To produce a flux disc such as 22 or 22', the components of one of the carriers of Table A are mixed in a manner well known in the plastic art to provide a soft plastic composition. To this soft plastic mixture, a fluxing material, in finely divided form, is added and intimately mixed. The resultant mixture is then calendered into sheets from which flux discs of the desired configuration are stamped out, or the mixture is inserted into moulds of the requisite shape. The discs are then "cured" by permitting the solvent to evaporate. This step may be accelerated by heating. The final product is a solid disc of the form of discs 22 or 22'. It will, of course, be understood that depending on the application, any desired shape of disc may be formed.

The exact proportion of the fluxing material to the carrier will vary depending on the weld specification.

Successful welds have been accomplished employing a mixture of approximately 50% by weight of carrier and 50% by weight of fluxing material. However, it has been found that stronger welds have been effected by employing flux discs having 96% to 92% by weight fluxing material in finely divided form and 4% to 8% by weight of carrier.

In one experiment, a successful flux disc was produced by a mixture including approximately 46% by weight iron oxide powder, 46% by weight aluminum powder, and 8% by weight carrier.

It will, of course, be understood that the present invention has been described by way of examples and modifications may be made thereto, without departing from the spirit and scope of the invention as defined by the appended claims.

What I claim is:

1. In stud welding for use with a stud having an end adapted to be welded which end has a terminal projection: a unitary element of fluxing material having a hole therethrough adapted to surround at least a portion of the cross-sectional area of said projection, said hole being dimensioned to permit the passage of the extremity of the projection therethrough in spaced relationship and arms formed integrally with said unitary element and extending outwardly therefrom.

2. In stud welding a unitary element as claimed in claim 1 in which said unitary element comprises an annular ring having outwardly extending radial arms.

3. In stud welding a unitary element as claimed in claim 1 in which said arms are regularly disposed.

4. In stud welding a unitary element as claimed in claim 1 in which said unitary element comprises an annular ring having regularly spaced apart outwardly extending arms formed integrally with said ring, said arms extending substantially beyond the cross-sectional area of said stud.

References Cited by the Examiner

UNITED STATES PATENTS

| | | | |
|---|---|---|---|
| 2,413,370 | 12/1946 | Palmer | 113—110 |
| 2,618,234 | 11/1952 | Armacost | 113—111 |
| 2,684,043 | 7/1954 | Hughes | 113—110 |
| 2,755,761 | 7/1956 | Carr | 113—111 |
| 2,815,729 | 12/1957 | Goodman | 113—110 |
| 2,833,030 | 5/1958 | Peaslee | 113—110 |
| 3,000,339 | 9/1961 | Coxe | 113—110 |
| 3,075,486 | 1/1963 | Laubmeyer et al. | 113—110 |

FOREIGN PATENTS 636,030  4/1950  Great Britain.

WHITMORE A. WILTZ, *Primary Examiner.*

JOHN F. CAMPBELL, MARCUS U. LYONS, CHARLES W. LANHAM, *Examiners.*